United States Patent
Saillet et al.

(10) Patent No.: US 7,477,263 B2
(45) Date of Patent: Jan. 13, 2009

(54) RELAYOUT OF ALL OR PART OF A GRAPH IN ASSOCIATION WITH A CHANGE IN STATE OF A GRAPH ELEMENT

(75) Inventors: Yannick Saillet, Stuttgart (DE); Kevin V. Stumph, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/372,675

(22) Filed: Mar. 10, 2006

(65) Prior Publication Data

US 2008/0012859 A1    Jan. 17, 2008

(51) Int. Cl.
G09G 5/00 (2006.01)
G09G 5/26 (2006.01)
G06T 11/00 (2006.01)
G06F 17/00 (2006.01)
G06F 3/048 (2006.01)

(52) U.S. Cl. ........................ 345/619; 345/441; 345/472; 715/243; 715/788; 715/799; 715/815

(58) Field of Classification Search ......... 715/243–247, 715/252, 253, 271, 700, 788, 763–765, 790, 715/815, 798–800; 345/619–620, 645, 472, 345/440–441
See application file for complete search history.

(56) References Cited

U.S. PATENT DOCUMENTS

| | | | |
|---|---|---|---|
| 6,215,502 B1 | 4/2001 | Ferguson | |
| 6,589,292 B1 | 7/2003 | Langford-Wilson | |
| 6,639,611 B1 | 10/2003 | Leduc | |
| 2002/0085002 A1* | 7/2002 | Lamping et al. | 345/441 |
| 2002/0105552 A1* | 8/2002 | Lane | 345/853 |
| 2003/0117436 A1* | 6/2003 | Kautto-Koivula et al. | 345/762 |
| 2004/0003550 A1 | 1/2004 | Simmons et al. | |
| 2004/0054965 A1* | 3/2004 | Haskell et al. | 715/501.1 |
| 2004/0117749 A1* | 6/2004 | Lalonde et al. | 716/11 |
| 2005/0183009 A1 | 8/2005 | Hannebauer et al. | |
| 2006/0122819 A1* | 6/2006 | Carmel et al. | 703/21 |
| 2006/0136825 A1* | 6/2006 | Cory et al. | 715/700 |
| 2007/0078886 A1* | 4/2007 | Rivette et al. | 707/102 |

* cited by examiner

*Primary Examiner*—Wesner Sajous
(74) *Attorney, Agent, or Firm*—Duke W. Yee; Megan M. Sugiyama; Mari A. Stewart (57) ABSTRACT

A computer implemented method, apparatus and computer program product for adjusting a graph. A modification to a first object in the graph is determined in which the first object has a position relative to a second object in the graph. The second object in the graph is repositioned, without user intervention, to accommodate the modification to the first object. The repositioning includes preserving the relative position of the first object to the second object.

39 Claims, 9 Drawing Sheets

RELAYOUT OF ALL OR PART OF A GRAPH IN ASSOCIATION WITH A CHANGE IN STATE OF A GRAPH ELEMENT

BACKGROUND OF THE INVENTION

1. Field of the Invention

The present invention relates generally to the data processing field, and more particularly, to a computer implemented method, apparatus and computer program product for adjusting a graph in association with a change in state of an object of the graph.

2. Description of the Related Art

A large number of design tools are based on a canvas on which a user can visually place objects in order to compose a graph and, if desired, connect the placed objects with one another. Using so-called free form canvas design tools, the user can place, arrange and resize objects at any position in the graph by utilizing a mouse. Some examples of free form canvas design tools include the following:

1. UML/IE (Unified Modeling Language/Information Engineering) visual designer tools: With these types of tools, a user can design a class hierarchy or a physical database model by placing objects on the canvas and drawing links between the objects. The links indicate the relationships between the classes or tables.
2. Workflow designer tools: With these types of tools, a user can design a workflow by placing objects representing activities on the graph and chaining the objects with arrows. The links indicate the sequence and condition under which the activities are going to be executed.
3. ETL (Extract Transform Load) designer tools: With these types of tools, a user can design a data flow by placing on the graph objects representing data sources, data targets or data transformation steps and by joining the objects with links. The links represent the way data is transferred from one operator to the next.
4. Graphical applications to draw charts or write presentations (Microsoft Powerpoint®, for example): A user can draw objects (geometric figures, cliparts, text, etc.) on the canvas and move and resize the objects with a mouse.

All the above types of designer tools have a common problem. In particular, when a user is working on an existing graph and wishes to resize an existing object or to add or remove an object; the layout of the graph should be adjusted after the operation so that the use of available space on the graph is optimal. Specifically, the following problems often occur when resizing an existing object in, adding an object to or removing an object from a graph:

1. The user increases the size of an object placed between other objects. After the modification, the modified object overlaps neighboring objects, and the neighboring objects have to be manually moved so that they do not become hidden or do not hide the modified object.
2. The user reduces the size of an object placed between other objects. After the modification, the space between the modified object and neighboring objects is too large so that the graph does not optimally use available space, and the layout of the graph appears inconsistent. In this case, the user will usually want to move the neighboring objects so that the interspace between objects is reduced and the layout appears more consistent.
3. The user wishes to add a new object between two existing objects. The space between the two existing objects is not sufficient to receive the new object, so the user must rearrange the graph to provide space for the new object.
4. The user removes an object from the graph. This removal frees up space on the graph. If the other objects in the graph are not moved so as to utilize the freed up space, the layout of the graph will appear inconsistent and the graph will use more space than necessary.

As should be apparent from the above examples, an effective mechanism is needed to rearrange or otherwise adjust a graph when one or more of its elements is resized, or an element is removed or added. Such a mechanism is particularly desirable in graphs in which objects can be expanded and collapsed. In such graphs, the objects have at least two possible representations or states, for example, an expanded state of increased size and a compressed state of reduced size. The user can switch from one representation to the other with a simple gesture (double-clicking on the object or clicking on some button in the object, for example). In that case, the size of objects in the graph may be modified frequently (each time the user expands or compresses an object of the graph), and the user is not reasonably able to efficiently rearrange other objects in the graph by hand each time an object is expanded or compressed.

One approach to the problem of adjusting a layout of a graph when an object of the graph is changed is to provide a function which automatically relayouts the graph. By invoking this function, the software will try to compute the best possible layout for the current graph. This solution, however, has several drawbacks:

1. It is usually slow: computing an optimal layout for a free form graph (a graph where the objects are not bound to any geometrical constraint, but can be freely moved at any position on the graph) is a complex, time-consuming operation.
2. The user is often unsatisfied with the result: it is very difficult to find an algorithm that will always produce the optimal layout for any kind of free form graph. In many cases, the arrangement found by the algorithm optimizes the space but does not take into account the semantic or meaning of some objects and the user has to modify the layout manually after the automatic relayout.
3. The algorithm often does not take the existing layout into account: if the user has arranged the objects in a particular order or geometry because it helps him/her find the objects or understand the semantic meaning of the graph, invoking an automatic relayout function will destroy this manual arrangement, and the layout of the graph will be recomputed artificially using the algorithm of the function.
4. Most of the time the user has to arrange the objects manually: Most design tools offer some additional commands to align several selected objects on a line or space them equally, but it does not really help the user react to a size modification (because an object's size has been increased or decreased) in a comfortable way.

It would, accordingly, be desirable to provide an effective mechanism for automatically adjusting a graph to accommodate a change in state of an object of the graph.

SUMMARY OF THE INVENTION

The present invention provides a computer implemented method, apparatus and computer program product for adjusting a graph. A modification to a first object in the graph is determined in which the first object has a position relative to a second object in the graph. The second object in the graph is repositioned, without user intervention, to accommodate the modification to the first object. The repositioning includes preserving the relative position of the first object to the second object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
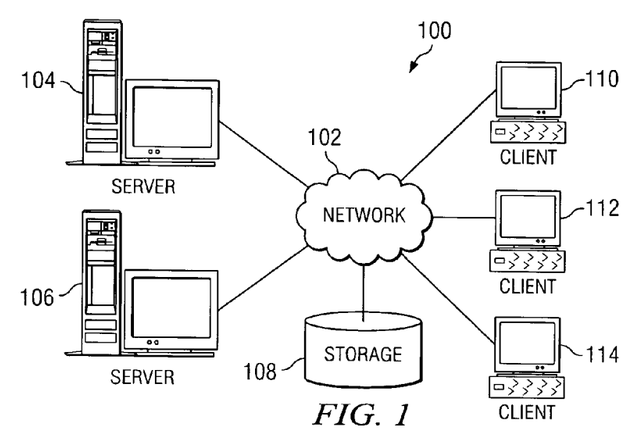
FIG. 1 depicts a pictorial representation of a network of data processing systems in which aspects of the present invention may be implemented.
Figure 2:
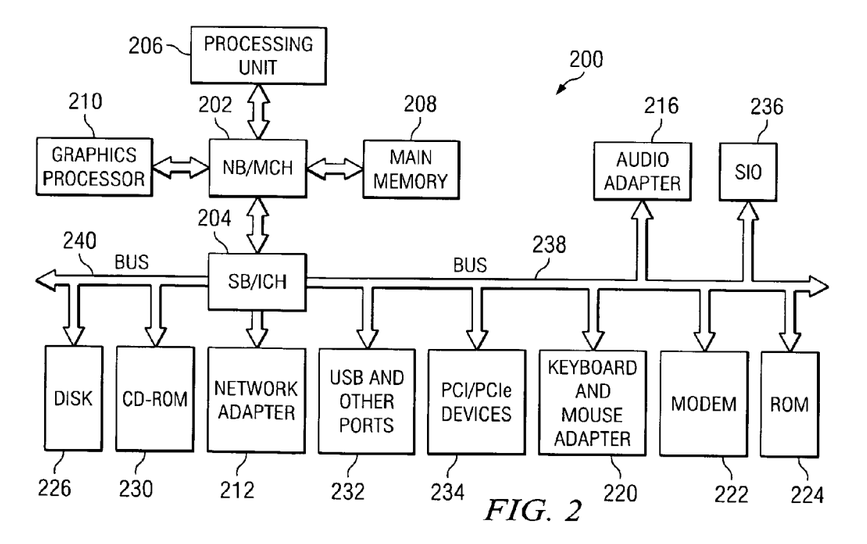
FIG. 2 depicts a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer program product for adjusting a graph. A modification to a first object in the graph is determined in which the first object has a position relative to a second object in the graph, The second object in the graph is repositioned, without user intervention, to accommodate the modification to the first object. The repositioning includes preserving the relative position of the first object to the second object.

More specifically, the aspects of the present invention may adjust the graph in association with a change in state of an object of the graph. A change in state of an object of the graph includes, for example, an increase or reduction in the size of an object in the graph, a change in the shape of an object in the graph, and the addition of an object to or the removal of an object from a graph. According to exemplary embodiments of the present invention, adjusting of the graph is accomplished by defining an algorithm which moves other objects of the graph in order to free up space or to suppress free space in a way that preserves the relative positions of the objects to each other. Contrary to the auto layout functions which are currently available, this algorithm does not attempt to compute a new optimal layout from scratch, but, instead, reacts to a local modification of the graph (i.e., resizing, adding or removing an object) by moving other objects of the graph to accommodate the modification. The objects are moved, or otherwise repositioned, such that the relative positions of the objects to each other is preserved.

According to a further exemplary embodiment of the present invention, this adjustment function is invoked automatically when an object on the graph is resized (for example when an object is expanded or collapsed).

According to yet a further exemplary embodiment of the present invention, the algorithm defines commands and UI gestures that allow the user to free up space on an existing graph prior to adding a new object to the graph, or to suppress unused space after removing an object from the graph.

An algorithm according to an exemplary embodiment of the present invention can rearrange objects of a graph to free up enough space to allow the size of one of the objects of the graph to be increased, or to reduce freed up space after the size of an object of the graph has been reduced. The algorithm is designed such that the geometrical arrangement i.e., the positions of objects relative to each other) is preserved. Furthermore, in the case of a large graph, the graph may be adjusted within a limited area around the location of the modification, such that objects that are closer to the modified object are repositioned but objects located further away from the modified object are essentially unaffected.

According to yet a further aspect of the present invention, a mechanism is provided which detects when an object has been resized and automatically invokes the relayout of objects surrounding the resized object. The user has the capability of setting up in the preferences to activate this mechanism.

In an exemplary embodiment of the present invention, this automatic relayout mechanism is activated for objects which have at least two states (for instance a collapsed state of reduced size and an expanded state of increased size), where each state change means that the size of the object is modified (for example, the collapsed state of an object could be a 32×32 icon representation, while in an expanded state, the size of the object could be increased to 200×100 pixels). For such objects where the user will often change the state (e.g., the size) the automatic relayout mechanism will reposition the objects, without user intervention, wherein repositioning includes preserving the relative positions of the objects to each other.

In an exemplary embodiment of the invention, a user can input information regarding object modification using a mouse tool or UI gestures. For instance, the mouse "tool", can allow the user to use the same algorithm to free up or reduce space in a circular region at any point of the graph in a semi-automatic way. The user chooses when and where to apply the algorithm and which space should be freed up. This function is primarily used before an object is added to the graph or after an object is removed from the graph. For example, the user can free up some space first, and then add a new object in the freed up space.

Other mouse tools (UI gestures) allow the user to free up or reduce some space in a horizontal or vertical direction. This is basically the same tool as described above, but the algorithm used to move the other objects is simpler, translating a part of the graph either horizontally or vertically.

Figure 3:
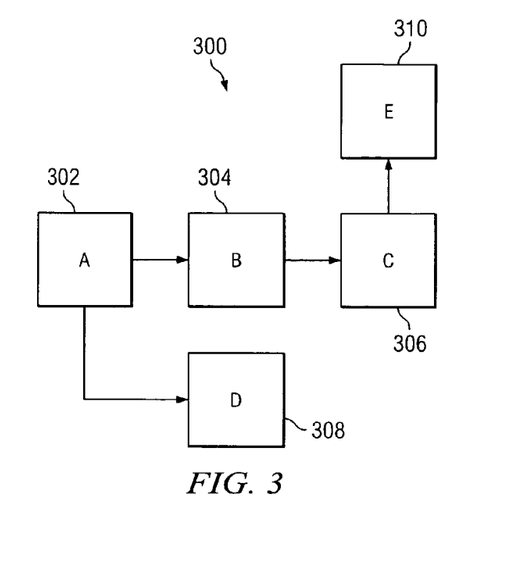
FIG. 3 illustrates an exemplary graph to assist in explaining aspects of the present invention.

FIG. 3 illustrates an exemplary graph to assist in explaining aspects of the present invention. The graph is generally designated by reference number 300, and includes five objects A, B, C, D and E, designated as objects 302, 304, 306, 308 and 310, respectively, in the figure, and arranged in a particular geometry selected by a user.

Figure 4:
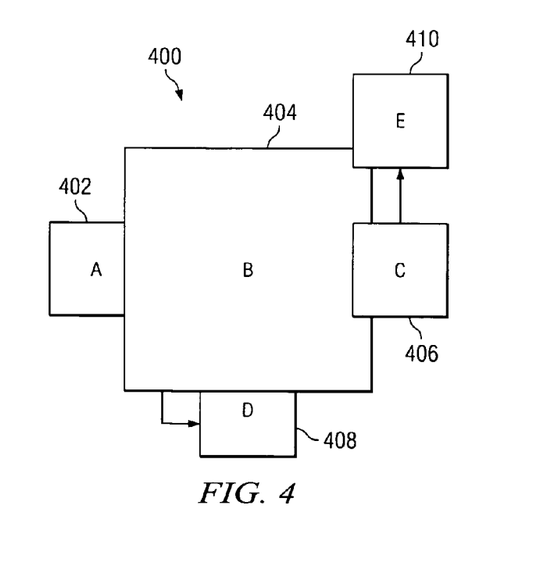
FIG. 4 illustrates the graph of FIG. 3 after an object of the graph is increased in size.

FIG. 4 illustrates the graph of FIG. 3 after an object of the graph is increased in size. In particular, FIG. 4 illustrates graph 400 in which object B, designated as object 404 in FIG. 3, has been increased in size. As can be seen in FIG. 4, enlarged object 404 overlaps objects 402, 406, 408 and 410 which are unchanged from objects 302, 306, 308 and 310 in FIG. 3.

Figure 5:
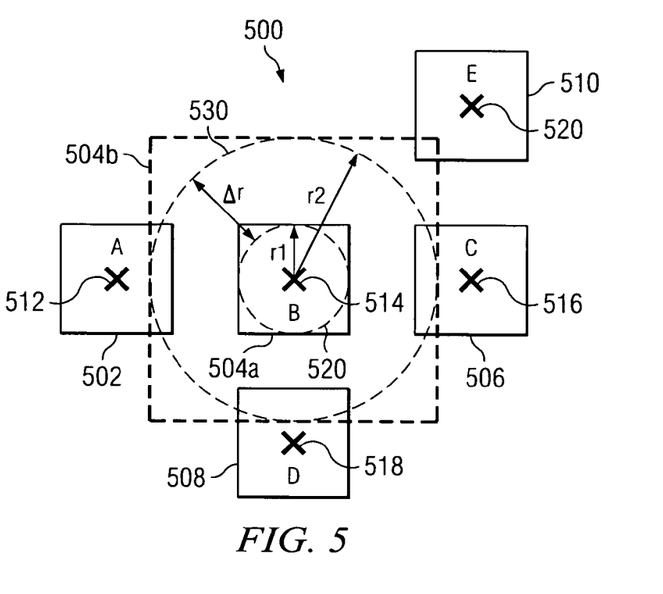
FIG. 5 is a diagram that schematically illustrates computations for determining a size and position of an object of a graph before and after enlargement of the object according to an exemplary embodiment of the present invention.

FIG. 5 is a diagram that schematically illustrates computations for determining a size and position of an object of a graph before and after enlargement of the object according to an exemplary embodiment of the present invention. In particular FIG. 5 illustrates computations to be performed to enable objects A, C, D and E of the graphs of FIGS. 3 and 4 to be moved to accomodate the increase in size of object B of the graph.

The graph in FIG. 5 is designated by reference number 500, and shows the size and position of object B before enlargement (504a) and after enlargement (504b). The center of each object composing the graph has to be known or computed. The centers of objects 502-510 are designated at 512, 514, 516, 518 and 520, respectively (note that the center of object B is the same before and after it is enlarged).

Circles that are contained in the object before and after the modification are then computed. As will be described hereinafter, this comparison is performed to compute the norm of the translation vector to apply to the other objects of the graph. FIG. 5 illustrates circle 520 in originally sized object 504a and circle 530 in enlarged object 504b. The positioning of the circles in FIG. 5 is intended to be exemplary only as there are several alternative ways to compute this circle. In particular, FIGS. 6A-6E schematically illustrate alternative ways to compute circles or ellipses used to compute the difference of radius in the direction of translation of objects of a graph according to exemplary embodiments of the present invention.

Figure 6A:
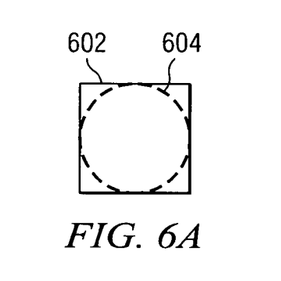
FIGS. 6A-6E schematically illustrate alternative ways to compute circles or ellipses used to compute the difference of radius in the direction of translation of objects of a graph according to exemplary embodiments of the present invention.
Figure 6B:
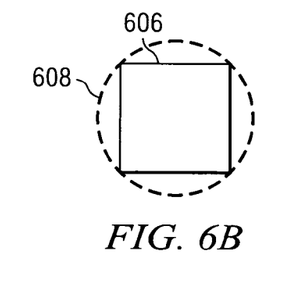
Figure 6C:
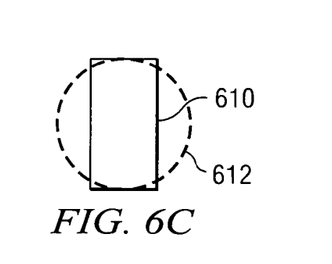
Figure 6D:
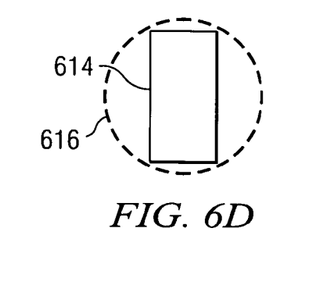

If the object to be modified is of square shape as shown at 602 in FIG. 6A and 606 in FIG. 6B, the circle can be either the circle tangent to each of the sides of the square as shown at 604 in FIG. 6A, or it can be the smallest circle containing the region (passing through each of the four corners of the square) as shown at 608 in FIG. 6B. If the object is of a rectangular shape other than square as shown at 610 in FIG. 6C and 614 in FIG. 6D, the circle can be either circle 612 tangent to the two sides of the rectangle which are the farthest from each other as shown in FIG. 6C, or the smallest circle containing the rectangle (passing through each of the four corners of the rectangle) as shown at 616 in FIG. 6D.

Figure 6E:
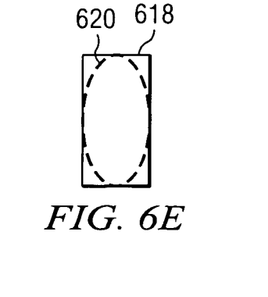

Yet another alternative is to compute an ellipse 620 contained in rectangle 618 to be enlarged as illustrated in FIG. 6E, or an ellipse passing through each corner of the rectangle to be enlarged (not illustrated).

Any of the above-described methods can be used to compute the size and position of an object. The same method, however, should be used to compute the circle/ellipse for the object before and after the resize operation.

The radius of each of the two circles or ellipses (before and after enlargement of the object) is computed and the difference between the radii ($\Delta r$) is also computed. These computations are illustrated in FIG. 5 by arrows representing radii r1 and r2 for circles 520 and 530, respectively, and by arrow $\Delta r$ representing their difference.

For each additional object in the graph, i.e., objects 502, 506, 508 and 510, a vector defining the translation of the object is then computed. The direction of each vector is the line passing through the center of the modified object (center 514 in FIG. 5) and the centers of the other objects of the graph to be considered (objects 502, 506, 508 and 510). The norm of each vector is computed by a function of the computed difference of radius ($\Delta r$) of the modified object and, optionally, the distance of each other object to the modified object.

According to an exemplary embodiment of the present invention, the norm of the translation vector can be $\Delta r$ itself. In such case, all other objects of the graph will be translated by the same distance independently of their position on the graph. An advantage of such a function is that the relayout is reversible.

Figure 7:
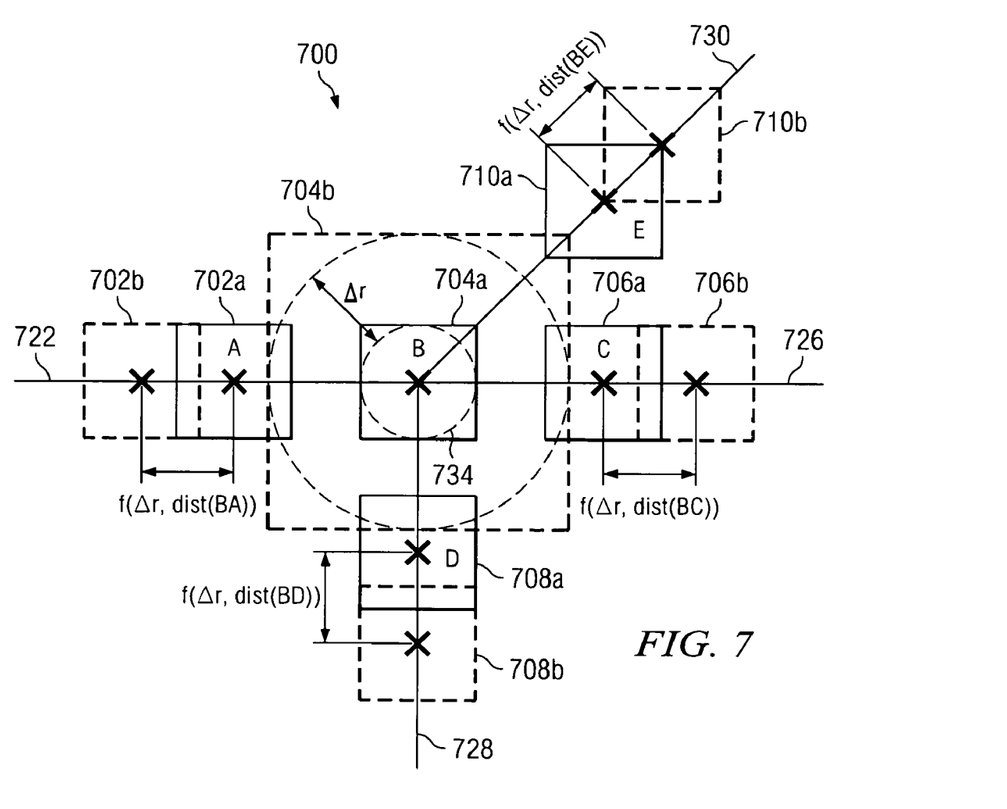
FIG. 7 is a diagram that schematically illustrates computations for determining new positions of other objects of a graph to accomodate a modification of one object of the graph according to an exemplary embodiment of the present invention.

FIG. 7 is a diagram that schematically illustrates computations for determining new positions of other objects of a graph to accomodate a modification of one object of the graph according to an exemplary embodiment of the present invention. As shown in FIG. 7, as a result of expanding object 704a in graph 700 to become enlarged object 704b, all the other objects 702a, 706a, 708a and 710a of the graph are moved away from enlarged object 704b by the same distance equal to $\Delta r$ to new positions represented by objects 702b, 706b, 708b and 710b.

If object 704b is later collapsed back to object 704a, all the other objects will move back to their original positions.

This kind of function is preferred for objects which are frequently expanded and collapsed, in order to avoid that the geometry of the graph becomes modified after several expanding/collapsing operations are performed on the same object.

For large graphs, where only a local modification of the graph is desired, a function is preferably chosen which decreases the norm of the translation vector when the distance to the modified object increases. For example a function of type $|v|=\Delta r*C/dist$ (where "C" is a constant and "dist" the distance between the center of the modified object and the object to be translated) can be used. By using such a function, objects which are far away from the zone of modification of the graph will be essentially unaffected by the change, while closer neighbors of the modified object will move to a greater extent to balance out the appearance of the graph. Alternatively, if "dist" is greater than some constant value, the translation vector can be assumed to be so small that it may not even be computed. This can reduce processing time by not having to move, or reposition the objects far away from a modification in large graphs having numerous objects.

For example, a modification to a first object in the graph may occur in which the first object has a first position relative to a second object in the graph and the first object has a second position relative to a third object in the graph. The first object in this example is closer to the second object than it is to the third object. With this modification of the first object, the repositioning of the second object in the graph occurs to accommodate the modification to the first object such that repositioning preserves the first object's position relative to the second object. As with the other illustrative examples, the repositioning occurs without user input.

Figure 8:
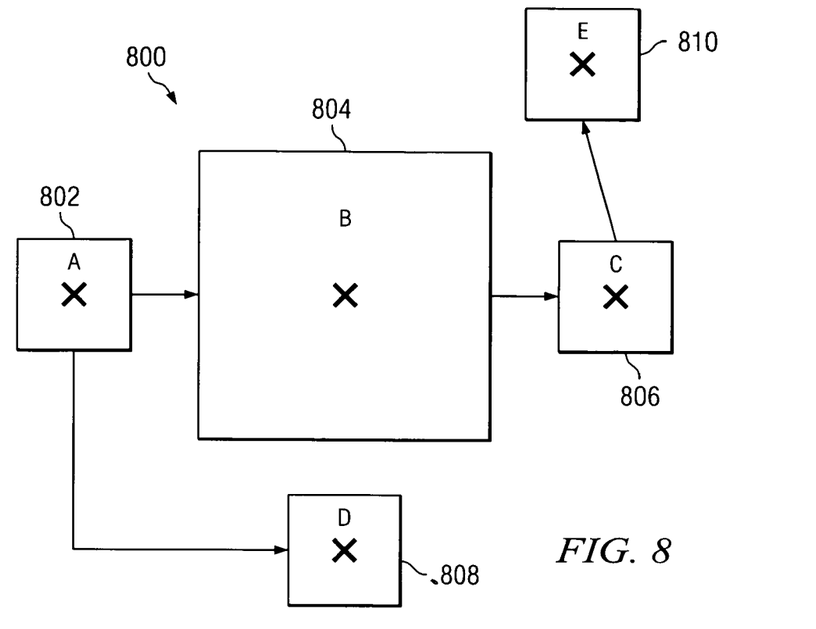
FIG. 8 illustrates the graph of FIG. 3 following expansion of one object of the graph and automatic relayout of other objects of the graph using the computations illustrated in FIGS. 5 and 7 according to an exemplary embodiment of the present invention.

After each object has been moved by the translation vector computed as described above, the graph will appear as illustrated in FIG. 8. In particular FIG. 8 illustrates the graph of FIG. 3 following expansion of one object of the graph and automatic relayout of other objects of the graph using the computations illustrated in FIGS. 5 and 7 according to an exemplary embodiment of the present invention. As shown in FIG. 8, the geometry of graph 800 is consistent with the geometry of graph 300 in FIG. 3 in that objects A, B and C designated as objects 802, 804 and 806, respectively, are aligned horizontally, objects B and D, designated as objects 804 and 808, respectively, are aligned vertically, and objects E and C, designated as objects 810 and 806, respectively, are nearly aligned vertically. Also, the distance between the objects in FIG. 8 is approximately the same as in FIG. 3. Thus, the relative positions of the objects to each other are preserved.

In this manner, a modification of a first object may result in the repositioning of a second object in the graph without user intervention. In these examples, this repositioning comprises moving the second object away from the first object. When the modification of the first object is a decrease in size, the repositioning of the second object may comprise moving the second object closer to the first object without user intervention.

Figure 9:
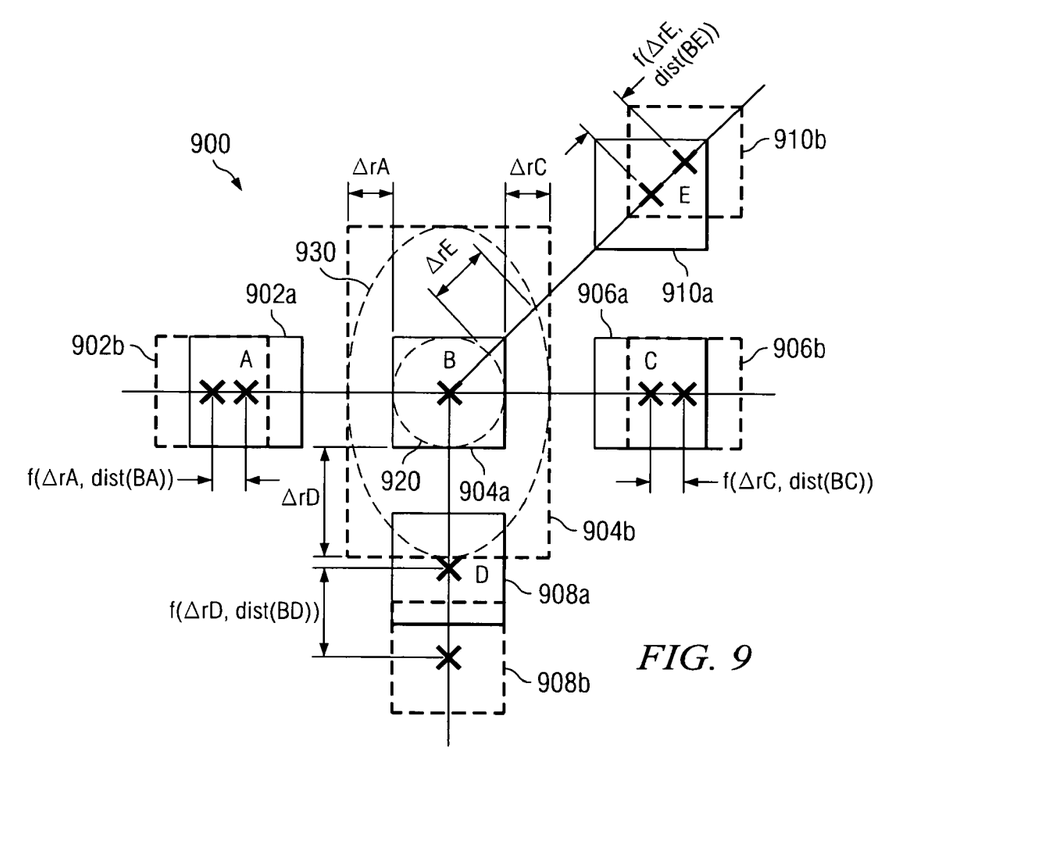
FIG. 9 is a diagram that schematically illustrates computations for determining new positions of other objects of a graph to accomodate a modification of one object of the graph according to a further exemplary embodiment of the present invention.

The aspects of the present invention also can be applied to changes in the shape of an object. For example, if one dimension of the object to be modified is longer than the other, e.g., if the object has a rectangular form, the computations can, as indicated above, be made by using ellipses instead of circles. FIG. 9 is a diagram that schematically illustrates computations for determining new positions of other objects of a graph to accomodate a modification of one object of the graph using an ellipse to perform computations according to a further exemplary embodiment of the present invention. In FIG. 9 object B in graph 900 is originally square object 904a but is expanded and reshaped to become elongated rectangular shaped object 904b. As shown in FIG. 9, two ellipses 920 and 930 fitting in both the original and the expanded objects, respectively, are computed (since original object 904a is a square, the ellipse is actually a circle).

The algorithm for adjusting the other objects of the graph is the same as previously described, with the difference being that $\Delta r$ is no longer a constant, but depends on the direction of the translation. Thus, it is necessary to compute for each object A, C, D, and E being moved from object positions designated as 902a, 906a, 908a and 910a to object positions designated as 902b, 906b, 908b and 910b, respectively, the difference in radius between the two ellipses in the direction of the translation (the distance between the two intersection points between the two ellipses and the translation line (in FIG. 9, $\Delta rA$, $\Delta rC$, $\Delta rD$ and $\Delta rE$).

Figure 10:
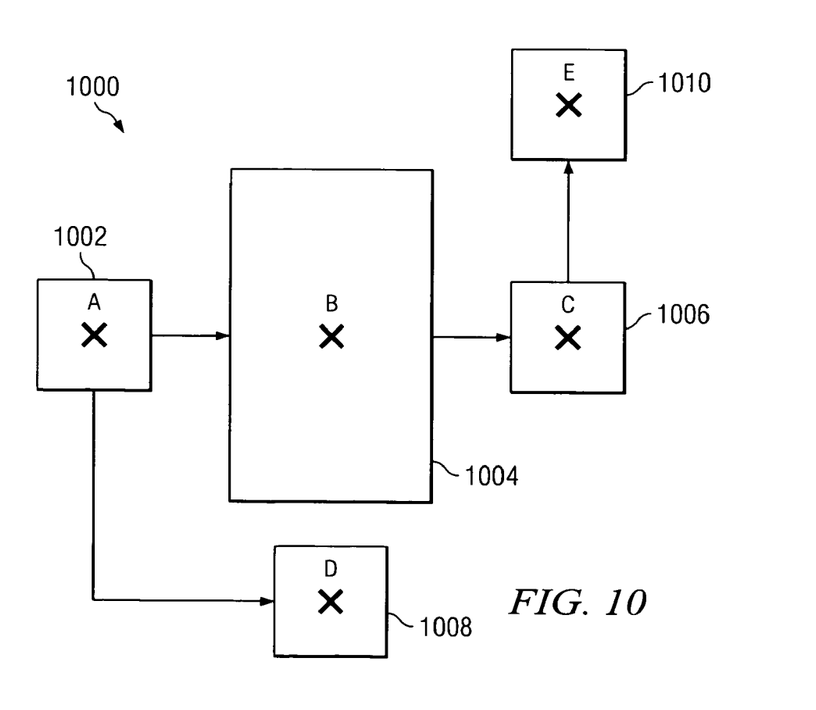
FIG. 10 illustrates the graph of FIG. 3 following expansion and change of shape of one object of the graph and automatic relayout of other objects of the graph using the computations illustrated in FIG. 9 according to an exemplary embodiment of the present invention.

FIG. 10 illustrates the graph of FIG. 3 following expansion and change of shape of one object of the graph and automatic relayout of other objects of the graph using the computations illustrated in FIG. 9 according to an exemplary embodiment of the present invention. As shown in FIG. 10, graph 1000 contains objects 1002, 1004, 1006, 1008 and 1010 laid out in such a manner as to provide a geometry that is consistent with the geometry of the graph 300 in FIG. 3, in that the relative positions of the objects to each other are preserved.

The algorithm schematically illustrated in FIG. 9 is the same as described previously.

The choice as to whether ellipses or circles are used depends on the geometry of the objects and also on the number of objects because of the difference in the speed of computation. For example, for an object that differs only slightly from being square, it may be preferred to use a circle for increased computational speed.

In some situations, a user may wish to free up some space at a certain location in a graph so that a new object can be added to the graph. The previously described algorithm can be used. For instance, if the position and the size of the new object are known, a circle or an ellipse can be computed for this new object. Thus, creating some space in a graph before the addition of a new object is the same as applying the previous algorithm on an object having a zero size (with a radius of zero) and being expanded to the size of the new, created object.

In the case of creation of a new object, the user may prefer to control relayout of the graph, instead of allowing it to be performed automatically. For this case, the present invention defines a semi-automatic relayout tool to allow the user to define the position and radius of the region to be freed up. The user chooses a tool in the menu bar or the tool bar of the canvas. When this tool is selected by the user, the mouse pointer is modified to indicate that this tool is currently selected for use.

The user then moves the mouse and clicks on the point of the graph which he/she wishes to be the center of the region to be freed up. The algorithm will then move all the objects in the graph to free up the appropriate space.

Figure 11:
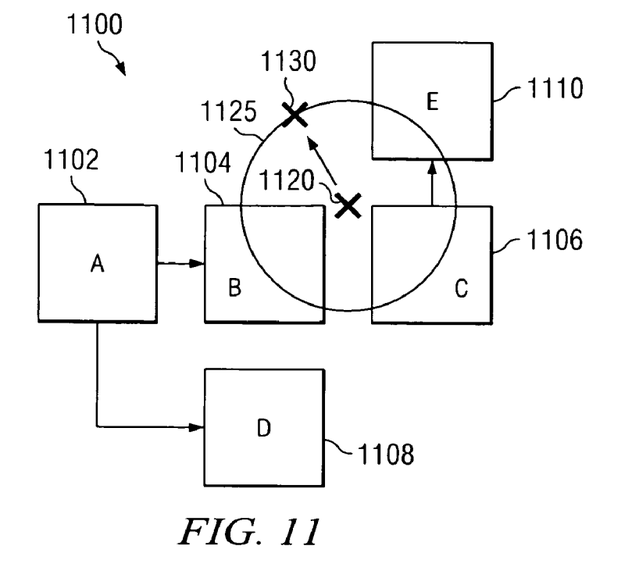
FIG. 11 illustrates mouse interaction for manual concentric graph expansion according to an exemplary embodiment of the present invention.

FIG. 11 illustrates mouse interaction for manual concentric graph expansion according to an exemplary embodiment of the present invention. As shown in FIG. 11, the user clicks on point 1120 in graph 1100. The user then drags the mouse away from this point. As the mouse is dragged from point 1120, a circle is dynamically drawn whose center is clicked point 1120 and passes through the current position of the mouse pointer, showing the user the circular region that will be freed up.

Figure 12:
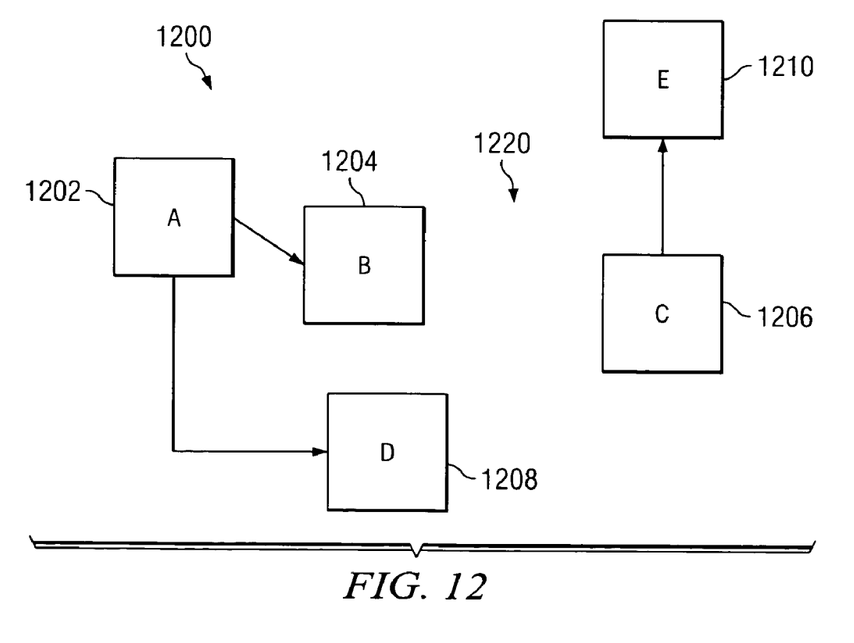
FIG. 12 illustrates the graph of FIG. 3 following the manual concentric graph expansion illustrated in FIG. 11 according to an exemplary embodiment of the present invention.

When the user has chosen the radius of the selected region (indicated by circle 1125 in FIG. 11, he/she can release the mouse button, or click a second time, for example, at point 1130, to validate the region. The algorithm is invoked and one or more of the objects of the graph, i.e., objects 1102, 1104, 1106, 1108 and 1110, will be moved away from the defined region to form a graph such as illustrated in FIG. 12. In particular, FIG. 12 illustrates the graph of FIG. 3 following the manual concentric graph expansion illustrated in FIG. 11 according to an exemplary embodiment of the present invention. As shown in FIG. 12, objects 1102, 1104, 1106, 1108 and 1110 shown in FIG. 11 have been repositioned as objects 1202, 1204, 1206, 1208 and 1210 in FIG. 12, and the user has freed up some space 1220 to add a new object on the graph.

The same method can also be applied to suppress free space. In this case, the same algorithm as described in FIG. 5 is used, with Δr then being the negative value of the radius of the drawn circle.

Figure 13:
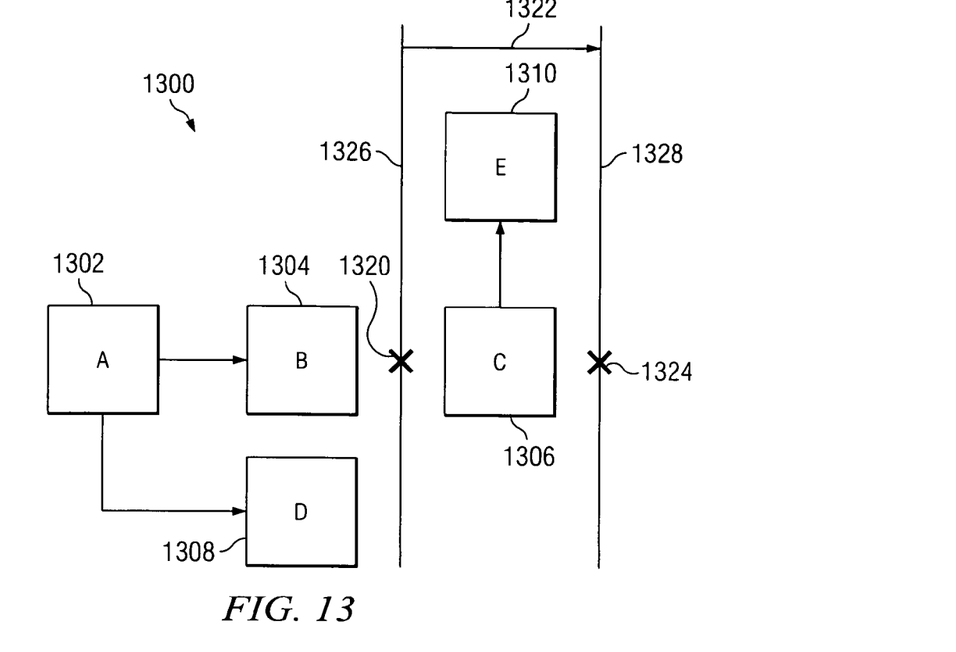
FIGS. 13 illustrates mouse interaction for manual horizontal graph expansion according to an exemplary embodiment of the present invention.
Figure 14:
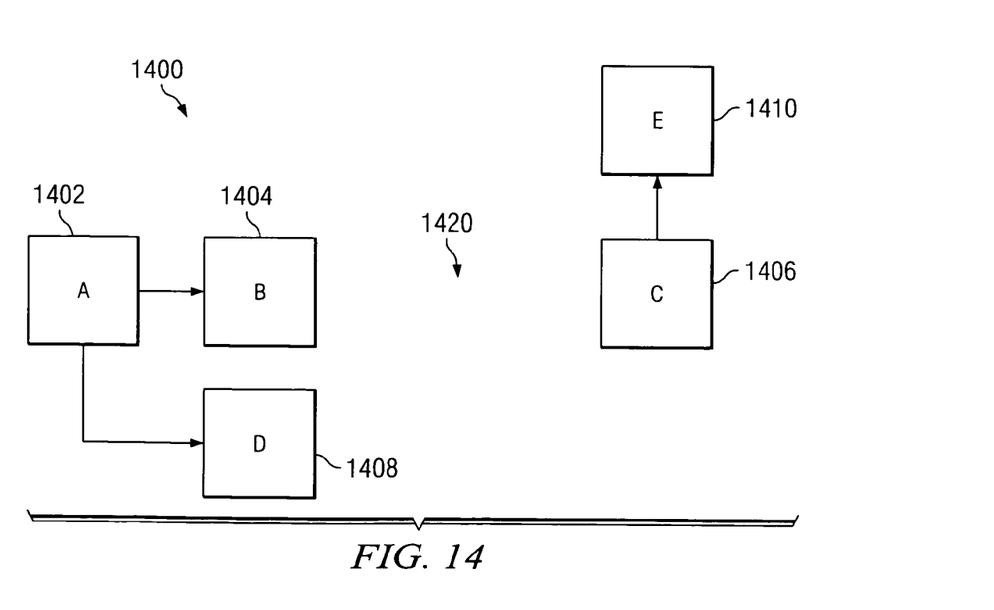
FIG. 14 illustrates the graph of FIG. 3 following the manual horizontal graph expansion illustrated in FIG. 13 according to an exemplary embodiment of the present invention.

According to exemplary embodiments of the present invention, a similar relayout tool is used to create/remove free space in a horizontal direction or in a vertical direction. FIG. 13 illustrates mouse interaction for manual horizontal graph expansion according to an exemplary embodiment of the present invention, and FIG. 14 illustrates the graph of FIG. 3 following the manual horizontal graph expansion illustrated in FIG. 13 according to an exemplary embodiment of the present invention. As shown on graph 1300 in FIG. 13, in the case of a horizontal translation, the user clicks on a first point 1320 and moves the mouse pointer horizontally. When a second point 1324 is chosen, a horizontal translation vector 1322 is defined. Lines 1326 and 1328 may be dynamically displayed on the screen to show the extent of the region that will be freed up. The norm of the vector is the distance between the two vertical lines 1326 and 1328 passing through the two points. Next, each object in the graph is analyzed. If the object center is located on the same side of the first line (vertical line 1326 passing through the first selected point 1320) as second line 1328 (i.e., objects 1306 and 1310), it will be translated by the vector computed previously. If the center of the object is located on the opposite side of first line 1326 with respect to second line 1328 (e.g., objects 1302, 1304 and 1308), its position remains unchanged.

By doing this, the user can translate a part of graph 1300 in FIG. 13 to the right or to the left, creating space for a new object. The resulting graph is illustrated as graph 1400 in FIG. 14. As should be apparent, objects 1306 and 1310 in FIG. 13 have been moved as shown to positions 1406 and 1410 in FIG. 14 to create space 1420, while objects 1302, 1304 and 1308 in FIG. 13 have not been moved as shown by objects 1402, 1404 and 1408 in FIG. 14.

The same procedure can also be used to suppress some space; in this case the vector is inverted.

Figure 15:
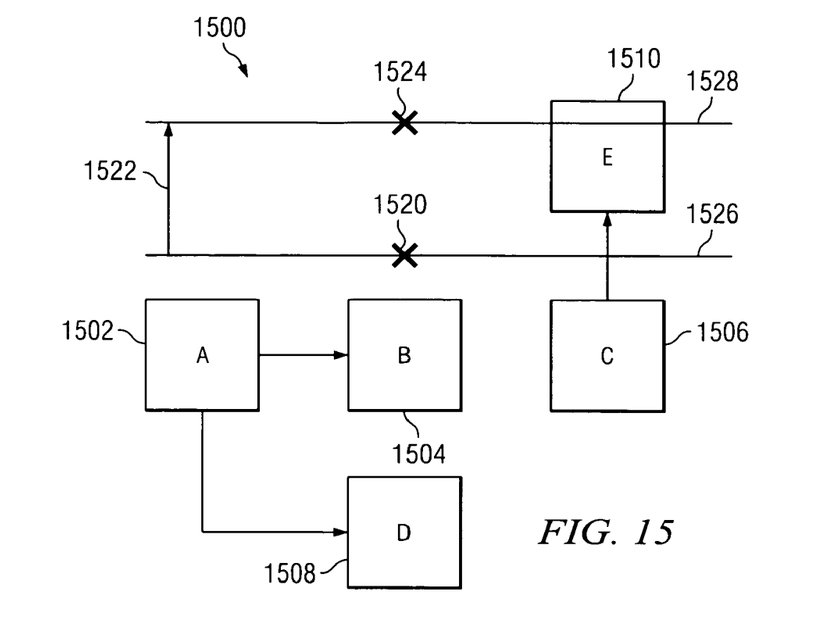
FIG. 15 illustrates mouse interaction for manual vertical graph expansion according to an exemplary embodiment of the present invention.
Figure 16:
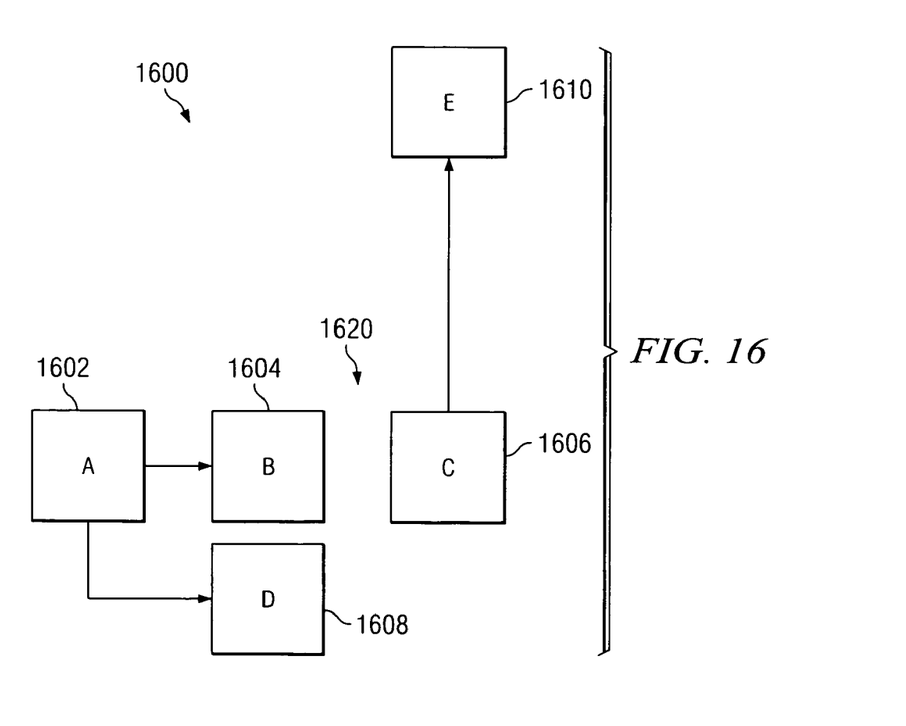
FIG. 16 illustrates the graph of FIG. 3 following the manual vertical graph expansion illustrated in FIG. 15 according to an exemplary embodiment of the present invention.

The same kind of function can also be provided for a translation in the vertical direction. FIG. 15 illustrates mouse interaction for manual horizontal graph expansion according to an exemplary embodiment of the present invention, and FIG. 16 illustrates the graph of FIG. 3 following the manual horizontal graph expansion illustrated in FIG. 15 according to an exemplary embodiment of the present invention. As shown in FIG. 15, the user clicks on first point 1520 and moves the mouse pointer vertically. When second point 1524 is chosen, a vertical translation vector 1522 is defined. The norm of the vector is the distance between the two horizontal lines 1526 and 1528 passing through the two points.

Next, each object in the graph is analyzed. If an object's center is located on the same side of the first line (horizontal line 1526 passing through the first selected point 1520) as the second line 1528 (i.e., object 1510), it will be translated by the vector computed previously. If its center is located on the opposite side of first line 1526 with respect to second line 1528 (i.e., objects 1502, 1504, 1506 and 1508), its position remains unchanged.

Similar to the horizontal process, the user can translate a part of the graph up or down creating some space for a new object. The resulting graph is illustrated as graph 1600 in FIG. 16. As shown, object 1510 in FIG. 15 has been moved to a new position designated as object 1610 in FIG. 16, and objects 1502, 1504, 1506 and 1508 in FIG. 15 have not been moved as shown by objects 1602, 1604, 1606 and 1608 in FIG. 16 resulting in freed up space 1620 for a new object.

Figure 17:
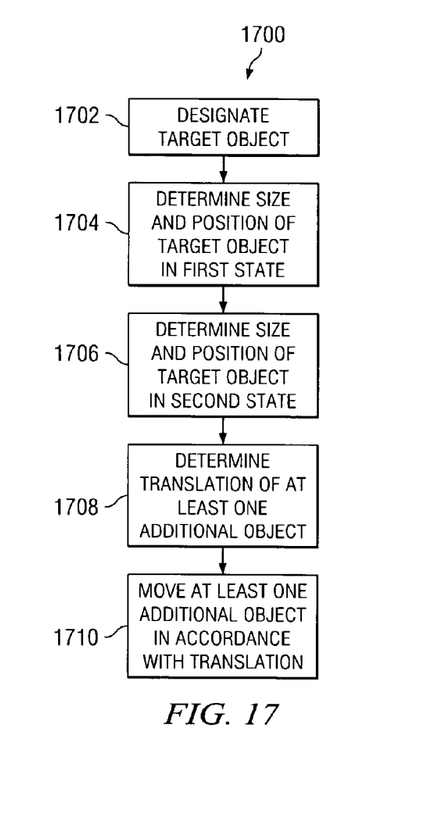
FIG. 17 is a flowchart that illustrates a method for adjusting a graph in association with a change in state of an object of the graph according to an exemplary embodiment of the present invention.

FIG. 17 is a flowchart that illustrates a method for adjusting a graph in association with a change in state of an object of the graph according to an exemplary embodiment of the present invention. The method is generally designated by reference number 1700, and begins by a user designating a target object to be changed from a first state to a second state (Step 1702). The size and position of the target object when the target object is in the first state is determined (Step 1704), and the size and position of the target object when the target object is in the second state is determined (Step 1706). As described above, the first state of the target object can be a compressed state and the second state can be an expanded state, or the first state can be the expanded state and the second state can be the compressed state. In addition, when an object is added to a graph, the first state is a state in which the target object is not present on the graph, and the second state is a state in which the target object is present on the graph. Alternatively, when an object is to be removed from a graph, the first state is a state in which the target object is present on the graph, and the second state is a state in which the target object is not present on the graph.

A translation for at least one additional object of the graph is then determined as a function of the difference in the size of the target object when in the first state and when in the second state (Step 1708), and the at least one additional object of the graph is moved in accordance with the determined translation to adjust the graph (Step 1710).

The present invention thus provides computer implemented method, system and computer program product for adjusting a graph in association with a change in state of an object of the graph. A computer implemented method for adjusting a graph in association with a change in state of an object of the graph includes designating a target object to be changed from a first state to a second state. The size and position of the target object when in the first state and when in the second state is determined, and a translation for at least one additional object of the graph is determined as a function of the difference in the size of the target object when in the first state and when in the second state. The at least one additional object of the graph is moved in accordance with the determined translation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, although in the exemplary embodiments described herein, the objects are squares or rectangles, the objects can also be of an irregular shape. For example, an L-shaped object can be changed from a first state to a second state by dividing the object into two rectangular portions and operating on the portions separately. The presented embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for adjusting a graph of objects, comprising:
    determining a modification to a first object in the graph, the first object having a position relative to a second object in the graph; and
    repositioning, without user intervention, the second object in the graph to accommodate the modification to the first object, wherein repositioning includes preserving the relative position of the first object to the second object.

2. The computer implemented method according to claim 1,
    wherein the modification to the first object comprises an increase in size of the first object, and
    wherein repositioning, without user intervention, the second object in the graph comprises moving the second object away from the first object.

3. The computer implemented method according to claim 1,
    wherein the modification to the first object comprises a decrease in size of the first object, and
    wherein repositioning, without user intervention, the second object in the graph comprises moving the second object closer to the first object.

4. The computer implemented method according to claim 1, wherein the modification to the first object comprises a change in shape of the first object.

5. A computer implemented method for adjusting a graph of objects, comprising:
    determining an addition of a first object to the graph, wherein the graph includes a second object with a relative position to a third object in the graph; and
    repositioning, without user intervention, the second object in the graph to accommodate the addition of the first object, wherein repositioning includes preserving the relative position of the second object to the third object.

6. A computer implemented method for adjusting a graph of objects, comprising:
    determining a removal of a first object from the graph, wherein the graph includes a second object with a relative position to a third object in the graph; and
    repositioning, without user intervention, the second object in the graph to accommodate the removal of the first object, wherein repositioning includes preserving the relative position of the second object to the third object.

7. A computer implemented method for adjusting a graph of objects, comprising:
    determining a modification to a first object in the graph, the first object having a first position relative to a second object in the graph, and the first object having a second position relative to a third object in the graph, wherein the first object is closer to the second object than it is to the third object; and
    repositioning, without user intervention, the second object in the graph to accommodate the modification to the first object, wherein repositioning includes preserving the first object's position relative to the second object.

8. The computer implemented method according to claim 1, wherein the modification to the first object comprises an increase in size of the first object from a zero size.

9. The computer implemented method according to claim 1, wherein the modification to the first object comprises a decrease in size of the first object to a zero size.

10. A computer-readable medium containing instructions for controlling an operating system to perform a method comprising:
    determining a modification to a first object in a graph, the first object having a position relative to a second object in the graph, and
    repositioning, without user intervention, the second object in the graph to accommodate the modification to the first object, wherein repositioning includes preserving the relative position of the first object to the second object.

11. The computer-readable medium of claim 10,
    wherein the modification to the first object comprises an increase in size of the first object, and
    wherein repositioning, without user intervention, the second object in the graph comprises moving the second object away from the first object.

12. The computer-readable medium of claim 10,
    wherein the modification to the first object comprises a decrease in size of the first object, and
    wherein repositioning, without user intervention, the second object in the graph comprises moving the second object closer to the first object.

13. The computer-readable medium of claim 10, wherein the modification to the first object comprises a change in shape of the first object.

14. A computer-readable medium containing instructions for controlling an operating system to perform a method comprising:
    determining an addition of a first object to a graph, wherein the graph includes a second object with a relative position to a third object in the graph; and
    repositioning, without user intervention, the second object in the graph to accommodate the addition of the first object, wherein repositioning includes preserving the relative position of the second object to the third object.

15. A computer-readable medium containing instructions for controlling an operating system to perform a method comprising:
    determining a removal of a first object from a graph, wherein the graph includes a second object with a relative position to a third object in the graph; and
    repositioning, without user intervention, the second object in the graph to accommodate the removal of the first object, wherein repositioning includes preserving the relative position of the second object to the third object.

16. A computer-readable medium containing instructions for controlling an operating system to perform a method comprising:
    determining a modification to a first object in a graph, the first object having a first position relative to a second object in the graph, and the first object having a second position relative to a third object in the graph, wherein the first object is closer to the second object than it is to the third object; and
    repositioning, without user intervention, the second object in the graph to accommodate the modification to the first object, wherein repositioning includes preserving the first object's position relative to the second object.

17. The computer-readable medium of claim 10, wherein the modification to the first object comprises an increase in size of the first object from a zero size.

18. The computer-readable medium of claim 10, wherein the modification to the first object comprises a decrease in size of the first object to a zero size.

19. An apparatus comprising:
    a memory having program instructions to execute an operating system;
    a processor configured to execute program instructions to perform the operation of:
    determining a modification to a first object in a graph, the first object having a position relative to a second object in the graph,
    repositioning, without user intervention, the second object in the graph to accommodate the modification to the first object, wherein repositioning includes preserving the relative position of the first object to the second object.

20. The apparatus of claim 19, wherein the modification to the first object comprises an increase in size of the first object, and wherein repositioning, without user intervention, the second object in the graph comprises moving the second object away from the first object.

21. The apparatus of claim 19,
    wherein the modification to the first object comprises a decrease in size of the first object, and
    wherein repositioning, without user intervention, the second object in the graph comprises moving the second object closer to the first object.

22. The apparatus of claim 19, wherein the modification to the first object comprises a change in shape of the first object.

23. An apparatus comprising:
    a memory having program instructions to execute an operating system;
    a processor configured to execute program instructions to perform the operation of:
    determining an addition of a first object to a graph, wherein the graph includes a second object with a relative position to a third object in the graph; and
    repositioning, without user intervention, the second object in the graph to accommodate the addition of the first object, wherein repositioning includes preserving the relative position of the second object to the third object.

24. An apparatus comprising:
    a memory having program instructions to execute an operating system;
    a processor configured to execute program instructions to perform the operation of:
    determining a removal of a first object from a graph, wherein the graph includes a second object with a relative position to a third object in the graph; and
    repositioning, without user intervention, the second object in the graph to accommodate the removal of the first object, wherein repositioning includes preserving the relative position of the second object to the third object.

25. An apparatus comprising:
    a memory having program instructions to execute an operating system;
    a processor configured to execute program instructions to perform the operation of:
    determining a modification to a first object in the graph, the first object having a first position relative to a second object in the graph, and the first object having a second position relative to a third object in the graph, wherein the first object is closer to the second object than it is to the third object; and
    repositioning, without user intervention, the second object in the graph to accommodate the modification to the first object, wherein repositioning includes preserving the first object's position relative to the second object.

26. The apparatus of claim 19, wherein the modification to the first object comprises an increase in size of the first object from a zero size.

27. The apparatus of claim 19, wherein the modification to the first object comprises a decrease in size of the first object to a zero size.

28. A computer-readable medium containing instructions for controlling an operating system to perform a method comprising:
    designating a target object to be changed from a first state to a second state;
    determining a size and position of the target object when in the first state;
    determining a size and position of the target object when in the second state;
    determining a translation for at least one additional object of a graph based on a difference between the size of the target object when in the first state and when in the second state; and
    moving at least one additional object of the graph in accordance with the determined translation.

29. The computer-readable medium of claim 28, wherein the first and second states comprise either a first compressed state and a second expanded state, or a first expanded state and a second compressed state.

30. The computer-readable medium of claim 28, wherein the first and second states comprise either a first state in which the target object is not present on the graph to a second state in which the target object is present on the graph, or a first state in which the target object is present on the graph to a second state in which the target object is not present on the graph.

31. The computer-readable medium of claim 28, wherein determining a size and position of the target object when in the first state, comprises:
    determining a first radius of a first ellipse that is either contained in or that contains the target object when the target object is in the first state; and wherein determining a size and position of the target object when in the second state, comprises:

determining a second radius of a second ellipse that is either contained in or that contains the target object when the target object is in the second state.

32. The computer-readable medium of claim 31, wherein the first ellipse is a circle.

33. The computer-readable medium of claim 31, wherein determining a translation for at least one additional object of the graph based on a difference between the size of the target object when in the first state and when in the second state, comprises:

determining a norm of a translation vector for the at least one additional object of the graph as a function of a difference between the first radius and the second radius.

34. The computer-readable medium of claim 33, wherein the norm of the translation vector equals the difference between the first radius and the second radius.

35. The computer-readable medium of claim 33, wherein the norm of the translation vector is a function of a distance between a center of the target object when the target object is in the second state and a center of the at least one additional object.

36. The computer-readable medium of claim 30, further comprising:

defining a location of the graph to free up space to receive the target object if the target object is to be changed from a first state in which the target object is not present on the graph to a second state in which the target object is present on the graph.

37. The computer-readable medium of claim 36, wherein defining a location of the graph to free up space to receive the target object, comprises:

defining one of a circular, elliptical, horizontal or vertical region of the graph.

38. The computer-readable medium of claim 30, further comprising:

defining a location of the graph to suppress free space if the target object is changed from a first state in which the target object is present on the graph to a second state in which the target object is not present on the graph.

39. The computer-readable medium of claim 38, wherein defining a location of the graph to suppress free space, comprises:

defining one of a circular, elliptical, horizontal or vertical region of the graph.

* * * * *